United States Patent [19]

Scheiner

[11] Patent Number: 5,478,521
[45] Date of Patent: Dec. 26, 1995

[54] METHOD FOR MAKING BUGHOLE-FREE HARDENED CEMENT STRUCTURAL UNITS USING BUGHOLE-REDUCING CEMENT ADMIXTURES

[75] Inventor: Paul Scheiner, Maynard, Mass.

[73] Assignee: W. R. Grace & Co.-Conn., New York, N.Y.

[21] Appl. No.: 322,960

[22] Filed: Oct. 12, 1994

Related U.S. Application Data

[63] Continuation of Ser. No. 938,632, Sep. 1, 1992, abandoned.

[51] Int. Cl.⁶ .................................. B28B 1/14; B28B 7/38
[52] U.S. Cl. ...................... 264/333; 106/802; 106/823; 264/338
[58] Field of Search ........................... 264/333, 69, 71, 264/338; 106/802, 823

[56] References Cited

U.S. PATENT DOCUMENTS

| | | | |
|---|---|---|---|
| 2,716,070 | 8/1955 | Seipt | 264/71 |
| 2,959,489 | 11/1960 | Wagner | 106/93 |
| 4,088,808 | 5/1978 | Cornwell et al. | 264/333 X |
| 4,229,224 | 10/1980 | Dawson et al. | 106/90 |
| 4,310,486 | 1/1982 | Cornwell et al. | 264/333 X |
| 4,524,163 | 6/1985 | Bradley et al. | 524/5 |
| 4,609,570 | 9/1986 | Couleau et al. | 264/333 X |
| 4,814,014 | 3/1989 | Arfaei | 106/90 |
| 4,946,506 | 8/1990 | Arfaei et al. | 106/724 |
| 4,946,904 | 8/1990 | Akimoto et al. | 525/327.8 |
| 4,960,465 | 10/1990 | Arfaei | 106/724 |
| 4,977,227 | 12/1990 | Negami et al. | 527/400 |
| 5,028,271 | 7/1991 | Huddleston et al. | 106/720 |
| 5,085,708 | 2/1992 | Moriya et al. | 106/819 |
| 5,154,771 | 10/1992 | Wada et al. | 264/333 X |
| 5,176,753 | 1/1993 | Brook | 106/819 |
| 5,180,430 | 1/1993 | Gartner et al. | 106/730 |

FOREIGN PATENT DOCUMENTS

| | | | |
|---|---|---|---|
| 1201254 | 3/1986 | Canada | 264/333 |
| 1243296 | 10/1988 | Canada . | |
| 0145837 | 12/1978 | Japan | 264/333 |
| 0008602 | 1/1983 | Japan | 264/71 |
| 0181755 | 10/1983 | Japan | 264/333 |
| 59-83968 | 5/1984 | Japan . | |
| 0306003 | 12/1988 | Japan | 264/333 |
| 2195328 | 4/1988 | United Kingdom . | |

OTHER PUBLICATIONS

Reading, T. J.; "Can We Get Rid of Bugholes?"; *Concrete Construction*, Jun., 1972, pp. 266–269.
Vollick, C. A.; "Revibration Produces Better Concrete"; *Concrete Construction*, Publication Date at Least as Early as 1988.
"The Fine Art of Placing and Compacting Architectural Concrete"; *Concrete Construction*, Publication Date at least as Early as 1988.
Stamenkovic, H.; "Surface Voids Can Be Controlled"; *Concrete Construction*, 1973, p. 597.
"Troubles With Architecture Concrete Finishes"; *Concrete Construction*, 1979, p. 329.
Shilstone, J. H.; "Surface Blemishes in Formed Concrete"; *Concrete Construction*, 1979, p. 719.
Thompson, M. S.; "Blowholes in Concrete Surfaces"; *Concrete Construction*, 1970, p. 43.
"Three Steps to Correct Surface Defects"; *Concrete Construction*, 1979, p. 215.

*Primary Examiner*—Karen Aftergut
*Attorney, Agent, or Firm*—Nicholas P. Triano, III; William L. Baker

[57] ABSTRACT

A method for making, clean, bughole-free hardened cement structural units, including the steps of a) applying a release agent to the surface of a form; b) preparing a cement composition; c) adding to the cement composition a water-soluble polymer dispersant and a solution viscosity-reducing agent; d) placing the cement composition of step c) into the form, e) curing the cement composition of step c) to form a hardened structural unit, and f) removing the structural unit from the form.

7 Claims, No Drawings

METHOD FOR MAKING BUGHOLE-FREE HARDENED CEMENT STRUCTURAL UNITS USING BUGHOLE-REDUCING CEMENT ADMIXTURES

This is a continuation of application Ser. No. 07/938,632, filed on Sept. 1, 1992, now abandoned.

FIELD OF THE INVENTION

This invention relates to improvements in cement admixtures for hydraulic cement compositions such as mortars, grouts and concretes. More particularly, the invention relates to novel bughole-reducing admixtures, cement compositions containing them, and methods for making hardened cement articles having substantially bughole-free and clean outer surfaces.

BACKGROUND OF THE INVENTION

Many concrete structural units are precast formations made at a location away from the construction site. This is done to provide uniform and high quality concrete formations which are difficult to form in the field. The precast formations are delivered to the job site and installed as part of the structure being formed. Such formed concrete units include, for example, beams, columns, exterior panels, pipes and culverts, and the like. The formation of such precast structural units conventionally requires using forms which contact a major portion of the unit's concrete surface as it is being cast and cured. In addition, job-site formation of concrete columns and the like are prepared similarly.

In recent years, more and more concrete structures are being left exposed as architectural surfaces. Thus, the appearance of these surfaces is becoming more significant, particularly for vertically formed surfaces where texture and absence of surface blemishes are parameters designed into the fabrication of the concrete.

Concrete surfaces are also being required to be smooth and blemish free for integrity of the concrete, for protection of the embedded reinforcing steel, for uninterrupted flow of fluid over the concrete surface, and for avoiding collecting foreign material on the surface. These criteria are important where concrete is used in highway bridges and culverts, sewer pipe applications, food processing plants, that surfaces that are exposed to freeze-thaw environments, and anywhere that imperfections in the concrete surface reduce the durability and functionality of the concrete article.

During the mixing of the components used to form hydraulic cement compositions, such as mortars (small aggregate such as sand, hydraulic cement such as Portland cement, water) and concrete (small aggregate, large aggregate such as gravel, cement and water), air is entrapped in the composition. In certain instances, known cement additives are incorporated into the composition to enhance one or more of its properties. However, some cement additives, such as naphthalene sulfonate-based superplasticizers, are known to also cause additional entrapment of air in the composition.

Although small amounts of air voids are useful in concrete structures and structural units, e.g., to enhance its freeze-thaw characteristics, they should be made up of small voids which are uniformly distributed within the structure. Thus, during the casting of an unset concrete composition into a mold, the composition and/or the mold are vibrated in attempts to cause the solids to settle and push out excess air and to cause uniform distribution of the remaining air in the cast unit.

However, it is well known that the major problem in producing concrete with controlled uniformly smooth surfaces is the propensity of the fluid cast concrete to develop large (1–3 inch), irregular voids at the interface with the form walls. Such voids are commonly called "bugholes" in the industry. These large voids detract from the appearance of the structural s unit, and tend to reduce the surface strength. Bugholes are typically pockets of entrapped air which did not migrate Otto of the concrete before the concrete stiffened. Their occurrence can be controlled to some extent by altering the proportions of the various aggregates used in the concrete mixture, using aggregates of a particular size and shape, and designing the mixture to have optimum amounts of cement, water, and pozzolans. Unfortunately these procedures have drawbacks; they do not always work; an optimum mix design might be prohibited by concrete design specifications, and using the optimum materials might be costly.

Placement and compaction procedures also have a strong impact on the cosmetics of the cast surfaces. However, to conduct these procedures in a fashion to reduce the appearance of surface voids typically will slow the production rate to the point where the operation is unprofitable.

In some circumstances, the forms can be designed to aid in dissipation of the surface voids. Titis includes using special surface coatings or materials and orienting the form in such a way as to minimize constrictions. These might reduce the voids, but not uniformly and usually not economically.

The final method resorted to by the concrete producer is to form and cure the structural units in the customary manner, then fill the surface voids on the surface of the structural unit. This process involves hand-troweling a grout composition into each void. The process is laborious, expensive, and alters the color and texture of the concrete surface.

The problem of surface appearance in concrete structural units is compounded by the customary use of release agents coating the form surface. The release agent promotes the easy removal of the form from the hardened concrete structural unit after casting. However, commonly used release agents often comprise either heavy greases or partially oxidized oils, and s badly stain the surface of the concrete structural unit, necessitating postasting treatment of the surface to remove the stains.

Accordingly, it is an object of titis invention to provide cement admixtures and compositions which may be used to make structural units having a smoother surface appearance, without having to resort to the laborious correctional or preventative treatments of the current art.

It is a further object of the invention to provide a means of reducing the formation of bugholes, and also to allow the use of inexpensive release agents while alleviating the problem of surface staining caused by their use.

SUMMARY OF THE INVENTION

The present invention relates to a cement admixture for reducing bugholes, comprising a water-soluble polymer dispersant and a solution viscosity-reducing agent.

The invention further relates to cement compositions comprising a hydraulic cement binder, a water-soluble polymer dispersant and a solution viscosity-reducing agent, and methods for making such cement compositions.

The invention further relates to a method of making a hardened cement structural unit having a substantially smooth and clean formed surface, comprising the steps of a) applying a release agent to the surface of a form; b) preparing a cement composition; c) adding to the cement composition a water-soluble polymer dispersant and a solution viscosity-reducing agent; d) placing the cement composition into said form, e) curing the cement composition to form a hardened structural unit, and f) removing the structural unit from said form.

DESCRIPTION OF THE INVENTION

The present invention is directed to the method of forming cast concrete structural units having surfaces which are substantially free of large voids and the like, commonly known as bugholes.

The subject structural units are formed from hydraulic cement compositions. The term "cement composition" as used herein refers to pastes, mortars and concrete compositions comprising a hydraulic cement binder. The above terms are terms of art. Pastes are mixtures composed of a hydraulic cement binder, for example, Portland cement, either alone or in combination with fly ash, silica fume or blast furnace slag, and water; mortars are pastes additionally including fine aggregate, and concretes are mortars additionally including coarse aggregate. Such compositions may additionally include other admixtures such as defoaming agents, air-entraining or detraining agents, set retarders and accelerators, water reducing agents, superplasticizers, and other components known to those in the art for altering properties of the composition, as long as the addition of such admixtures does not adversely affect the advantageous results obtained by the method and admixtures of the present invention. The cement compositions of this invention are formed by mixing required amounts of certain materials, e.g., a hydraulic cement, water, and fine or coarse aggregate, as may be applicable for the particular cement composition being formed.

The admixtures of the invention comprise a polymer dispersant and a solution viscosity-reducing agent. "Polymer dispersant" is herein defined to mean any water-soluble polymeric compound that functions as a dispersant or hydraulic cement superplasticizer, and comprises a a) polymeric backbone moiety and b) polymeric side chain moieties, wherein one of said a) and b) polymeric moieties is a polyether moiety, and the other is a non-polyether moiety formed by polymerization of ethylenically-unsaturated monomers. ("Water-soluble" means that the polymer dispersant should be soluble or dispersible in a 100% water medium, or a medium principally comprised of water, e.g., an aqueous alcohol medium containing a minor percentage of alcohol. The pH of the medium may be adjusted as necessary to cause or optimize polymer solubility.)

As used herein, "polyether moiety" means any homopolymer or copolymer having repeating units linked by carbon-oxygen ether linkages, which is capable of having ethylenically-unsaturated monomer or polymer side chains attached to the backbone; alternately, such polyethers may be attached to a backbone formed by polymerization of ethylenically-unsaturated monomers. The polyether moiety thus has repeating units of the formula —(—O—R—)— wherein R is an organic moiety containing a carbon atom linked to the oxygen through a single covalent bond. The polyether moiety may contain two or more different repeating units with different R moieties.

When the polyether moiety is the backbone of the polymer dispersant, one or more of the repeating ether units may contain one or more carbon atoms which can function as side-chain attachment sites, e.g., by undergoing hydrogen or halogen abstraction. It is generally preferred that such sidechain attachment occur in the R moieties, although such sites may additionally or alternatively be provided by other groups or atoms which is may be present in the polyether moiety.

R may be an arylene group, e.g., phenylene, provided that when the polyether moiety is the backbone of the polymer dispersant, other groups or moieties are present in the polymer which provide side-chain attachment sites; e.g., a divalent alkylaryl group wherein one of the alkyl carbon atoms is linked to the oxygen, e.g.,

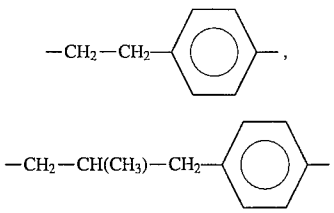

a saturated cyclic group, e.g., cyclohexylene; or a saturated or unsaturated, substituted or unsubstituted aliphatic group.

Saturated aliphatic groups are preferred R groups, particularly alkylene groups such as ethylene, propylene, butylene, isopropylene, or isobutylene. The preferred polyethers for use in the invention (as either backbone or side chain polymer moieties) are accordingly polyoxyalkylene, e.g., polyoxyethylene homopolymers, polyoxypropylene homopolymers, and oxypropylene/oxyethylene copolymers. Polyoxyalkylenes are well known and a variety of such polymers are commercially available. Commercial polyoxyalkylenes which may be used in this invention include those sold under the PLURACOL, TETRONIC, and PLURONIC tradenames by BASF Wyandotte Corporation and under the JEFFAMINE and THANOL tradenames by Texaco. The polyether moiety may include reactive groups, as e.g., amino, carboxyl, or hydroxyl groups, positioned at the end of the polymer (when the polyether moiety is the backbone of the polymer dispersant) or at intermediate points along the polymer chain. When the polyether moiety is the backbone of the polymer dispersant, these groups may be derivatized before or after attachment of the side chains, if desired. Preferred polyoxyalkylene backbones, for example, include terminal hydroxyl groups arising from polymerization of the corresponding alkylene oxide. These hydroxyl groups may remain unreacted or may be derivatized before or after attaching the side chain(s) to provide, for example, urethane or ester derivatives.

A preferred number average molecular weight range, as determined by gel permeation chromatography, of the polyether backbone is preferably from about 200 to 30,000, and more preferably is in the range of about 500 to 10,000.

Where the backbone is a relatively hydrophobic polyether material, such that it has low water dispersibility or solubility, an appropriate non-polyether side chain moiety which imparts the desired solubility or is dispersibility is attached to the polyether. Non-polyether side chain moieties used for this purpose should accordingly be more hydrophilic than the polyether backbone. Preferred non-polyether side chain moieties, from the standpoint of promoting water dispersibility and solubility, are those which contain salt-forming groups. The salt-forming groups may be provided by homopolymerizing or copolymerizing ethylenically unsaturated monomers containing an acid group, such as acrylic acid, methacrylic acid, or 2-sulfoethylmethacrylate, to form the side chain. Alternatively, monomers may be used which contain precursors which can be reacted after attachment to the polyether backbone to provide a salt-forming group, e.g., maleic s anhydride may be incorporated into the side chain and subsequently hydrolyzed to the acid form. In general, after attachment the acid group is converted to its salt form by neutralization with a base. The salt-forming groups may also be provided by monomers containing a quaternary ammonium group or an amine group which can be quaternized after polymerization.

The ethylenically unsaturated monomers used in the invention are polymerizable monomers characterized by the presence therein of at least one polymerizable ethylenic unsaturated group of the structure >C=C<. When the backbone of the polymer dispersant comprises a polyether moiety, such monomers which can be attached to the polyether to provide a polymer dispersant having a greater plasticizing capability than the polyether, and which permits water dispersibility or solubility of the polymer dispersant, can be used in this invention. The monomers can be used singly or in combination to produce homopolymer or copolymer side chains. Examples of ethylenically unsaturated monomers which can be used are the α,β-ethylenically unsaturated acids, e.g., acrylic acid, methacrylic acid, and itaconic acid; the αβ, ethylenically unsaturated acid esters, e.g., methyl acrylate, methylmethacrylate, ethylacrylate, 2-hydroxypropylacrylate, 2hydroxypropylmethacrylate, 2-hydroxyethylmethacrylate, 2hydroxyethylacrylate, 2-sulfoethylmethacrylate, 3-sulfopropylethacrylate, bis(3-sulfopropyl)itaconate, 2-phenoxyethlacrylate, tetrahydrofurfurylacrylate, cyclohexyhnethacrylate, polyethylene glycol monomethacrylate, polypropylene glycol monoacrylate, and caprolactone acrylate monomers such as Tone M-100 monomer of Union Carbide Corp., the α, β-ethylenically unsaturated acid amides, e.g., acrylamide, methacrylamide, diacetone-acrylamide, dimethylaminopropylmethacrylamide, and 2-acrylamido-2-methylpropane sulfonic acid; ethylenically unsaturated acids and acid esters of the formula

$$CH_2=C-(C)_n-COOR_4 \quad (I)$$
with $R_1, R_2$ above and $R_3$ below the central carbons wherein $R_1$, $R_2$, $R_3$, and $R_4$ are each independently hydrogen or alkyl, and n is 1 to 20; vinyl esters such as vinyl acetate; vinyl ethers; vinyl ketones; vinyl aromatic monomers such as styrene and styrenic sulfonic acid; N-vinylpyrrolidone; polymerizable acid anhydrides such as maleic anhydride and itaconic anhydride; aminoalkylacrylate and methacrylates, e.g., dimethylaminoethyl acrylate and diethylaminoethyl methacrylate; betaines such a N-(3-sulfopropyl)-N-methacryloxyethyl-N,N-dimethylanunonium betaine; and cationic quaternary ammonium monomers such as the quaternized aminoalkyl acrylates and methacrylates. The α, β-ethylenically unsaturated acids are preferred monomers for use in this invention.

When the backbone of the polymer dispersant is a polyether moiety, it should be understood that, depending on the nature of the monomer, single monomeric units may become attached to the backbone. In particular, monomers conforming to the above formula (I) may attach in this manner. Accordingly, as used herein, the term "side chain" and "side chain polymer" broadly include and refer to attached moieties comprised of a single monomeric unit. Similarly, reference herein to the polymerization of ethylenically unsaturated monomers broadly includes the grafting of single monomeric units onto the polyether backbone.

Exemplary polymer dispersants comprising a polyether backbone which may be used in the invention are graft copolymer plasticizers like those described in U.S. Pat. No. 4,814,014, the disclosure of which is incorporated herein by reference. Such graft copolymer plasticizers comprise a polyether backbone polymer having an average molecular weight of about 200 to 30,000 and grafted side chain polymers prepared by polymerization of an ethylenically unsaturated monomer, wherein the graft copolymer plasticizer contains about 2% to 40% by weight of the side chain polymers.

When the polymer dispersant of the invention comprises a non-polyether moiety backbone, the backbone may be produced from the ethylenically-unsaturated monomers described hereinabove. The backbone may comprise a homopolymer or copolymer of said monomers. In a preferred polymer dispersant comprising a non-polyether moiety backbone, the backbone is derived by copolymerization of a polyether, which is terminated at one end with a polymerizable ethylenically-unsaturated group, e.g., allyl or methacrylate, with a suitable comonomer. Particularly preferred comonomers are maleic acid, maleic anhydride, and acrylic acid. Furthermore, the same considerations applied to selecting the non-polyether moiety side chains pendent on a polyether moiety backbone (i.e., providing a polymer dispersant having a greater plasticizing capability than the non-polyether backbone, and which permits water dispersibility or solubility of the polymer dispersant) also apply when selecting the appropriate types and amounts of polyether moiety side chains to be attached to the non-polyether backbone.

An exemplary class of polymer dispersants of the invention comprising a non-polyether moiety backbone and polyether side chain moieties, are those of the kind described in U.S. Pat. No. 4,946,904, the disclosure of which is incorporated herein by reference. These compounds comprise a copolymer of an allyl-terminated polyoxyalkylene and maleic acid or anhydride. Preferred polymer dispersants of titis type for use in the present invention are available under the name MALIALIM (Nippon Oil and Fats Co., Ltd.).

"Solution viscosity-reducing agent" is defined to mean a water-soluble as compound, which, when added to a solution of the polymer dispersant, reduces its viscosity. Such agents are advantageously certain alkali metal and alkaline earth metal salting-in salts of the lyotropic series, low molecular weight amide group-containing compounds, and mixtures thereof. By "salting-in salts of the lyotropic series" is meant the group consisting of alkali metal and alkaline earth metal thiocyanate, iodide, bromide, nitrate, chloride, fluoride, and perchlorate. Preferred salts of this series are alkali metal and alkaline earth metal salts of thiocyanic acid, e.g., sodium or calcium thiocyanate. Mixtures of the aforesaid salts may also be used. By low molecular weight amide group-containing compounds are meant those having an average molecular weight of less than about 200. Examples of these are urea, acetamide, and propanamide, with urea particularly preferred. Again, mixtures of these compounds may also be used.

The amount of the polymer dispersant added to the cement composition will depend on the requirements of the given application. However, higher levels of the polymer dispersant added to the cement composition will provide greater amounts of bughole reduction than will lower levels. Generally the level of polymer dispersant in the cement composition is at least about 0.01% of the dry weight of the cement in the composition, preferably from about 0.01% to 1.0%, and more preferably from about 0.05% to 0.6%.

The amount of solution viscosity-reducing agent in the cement composition will also depend on the particular application, but it will generally be at least about 0.15% of the dry weight of cement in the composition, preferably about 0.15% to 1.0%, and more preferably from about 0.2% to 0.6%.

The ratio of solution viscosity-reducing agent to polymer dispersant in the cement composition may also be varied, depending on the particular application, but preferred ratios of solution viscosity-reducing agent to polymer dispersant are from about 1:10 to 1:0.5, and more preferably from about 1:6 to 1:1.

A preferred admixture of the invention comprises a solution viscosity-reducing agent selected from the group consisting of alkali metal earth metal salting-in salts of the lyotropic series, and low molecular weight amide group-containing compounds; and a polymer dispersant which is a graft copolymer plasticizer having a polyether backbone polymer with an average molecular weight of about 200 to 30,000, and side-chain polymers prepared by polymerization of an ethylenically-unsaturated monomer, the graft copolymer plasticizer containing about 2% to 40% by weight of said side-chain polymers, where the weight ratio of the solution viscosity-reducing agent to polymer dispersant is in the range of from about 1:10 to 1:0.5, and more preferably from about 1:6 to 1:1.

Another preferred admixture of the invention comprises a solution viscosity-reducing agent selected from the group consisting of alkali metal and alkaline earth metal salting-in salts of the lyotropic series, and low molecular weight amide group-containing compounds, and a polymer dispersant having polyether side chains, which is a copolymer of maleic anhydride and an allyl ether of the formula $CH_2=CHCH_2O(C_2H_4O)_9CH_3$ and having a number average molecular weight of from about 5,000 to 25,000, where the weight ratio of the solution viscosity-reducing agent to polymer dispersant is from 1:10 to 1:0.5, and more preferably from about 1:6 to 1:1.

It is usually easiest to add the admixture of the invention to wet cement slurries as a single admixture, in amounts and proportions as taught above. However, the components may be added separately, either to a wet mix, or to a dry mix in the manufacturing plant.

In the method of the invention a cement structural unit is made by preparing a cement composition; adding to the cement composition an admixture of the invention and placing the cement composition into the form, curing the cement composition to form a hardened structural unit, and removing the structural unit from the form. Oftentimes it is useful to apply a release agent to the surface of the form, before the wet cement composition is placed in the form, to facilitate removal of the hardened cement structural unit. As such, a method of the invention comprises the additional step of applying a release agent to the form surface prior to introduction of the wet cement composition. As used herein, "release agent" is defined to mean any oil-based coating normally applied to, or otherwise suitable for applying to, a concrete form for facilitating release of a hardened cement structural unit which has been cast and cured in the form. As stated previously these oil-based release agents invariably stain the surface of the structural unit. Surprisingly, however, and by an undetermined mechanism, the surfaces of structural units formed from cement compositions of the invention are stainfree, saving workers the annoyance of having to clean the surface of the structural unit before using or shipping the finished article. Examples of release agents which may be used in the invention are those available under the tradenames CRESSET 880, NOXCRETE, DRYDENE, and HY-LUBE.

The following examples are given for illustrative purposes only and are not meant to be a limitation on the claims appended hereto. All parts are by weight unless otherwise indicated.

EXAMPLE 1

To show the effects of adding solvent viscosity-reduction agents of the invention to solutions of the polymer dispersants of the invention, aqueous solutions comprising 40% by weight of a polymer dispersant of the invention comprising a polyether moiety backbone and non-polyether moiety side chains, were prepared. The polymer dispersant, "Polymer Dispersant 1", was prepared by the following procedure. A mixture of 20.0 g acrylic acid and 1.0 g tert-butyl perbenzoate was added over a one hour period to 80.0 g of a hydroxyl-terminated oxyethylene/oxypropylene copolymer sold under the tradename PLURACOL-W5100N by BASF Wyandotte Corporation (average molecular weight of about 4600) at 145° C. under nitrogen. After the addition was competed the reaction mixture was maintained at 145° C. for an additional hour. The reaction mixture was then added to a mixture of 130 g water and 9 g sodium hydroxide, resulting in a homogeneous solution. The solids concentration in the solution was measured to be about 42% and the pH was about 9.0.

Mixtures of these solutions and various salts were prepared as indicated in Table 1, and the viscosity of each mixture was determined using a Brookfield viscometer with the #1 spindle at 12 RPM. The results are displayed in Table 1.

TABLE 1

| Amount of Polymer Solution used (g) | Salt | Amount of Salt added (g) | Viscosity (cps) |
|---|---|---|---|
| 210 | — | — | 375 |
| 210 | Urea | 7.4 | 292 |
| 210 | NaBr | 12.7 | 280 |
| 210 | $NaClO_4$ | 15 | 330 |
| 210 | NaSCN | 10 | 297 |

EXAMPLE 2

The bughole-reducing performance of an admixture of the invention containing sodium thiocyanate as the solvent viscosity-reduction agent was tested in the following manner. Concrete was prepared in two cubic yard batches. Each batch was prepared by mixing together 725.7 kg Portland cement, 1551.3 kg ⅜" limestone, 961.6 kg sand, and 264.9 kg water for 30 seconds, then adding an admixture to each as indicated in Table 2, below.

The polymer dispersant, "Polymer Dispersant 2", was prepared using the procedure for Polymer Dispersant 1, but 26 g of acrylic acid was used in the synthesis, and a oxyethylene/oxypropylene copolymer identified as UCON 75H450 (Union Carbide) replaced the material used in Polymer Dispersant 1. The admixtures of this and subsequent examples were prepared by dissolving or dispersing the desired amounts of the admixture components in a water solvent.

TABLE 2

| | Total admixture dose (% s/s on cement) | NaSCN component dose (% s/s on cement) |
|---|---|---|
| Polymer dispersant 1 | 1.103 | 0.29 |
| Polymer dispersant 1 + NaSCN | 0.34 | 0.05 |
| Polymer dispersant 1 + NaSCN | 0.39 | 0.10 |
| Polymer dispersant 1 + NaSCN | 0.44 | 0.15 |
| Polymer dispersant 2 | 0.29 | 0.0 |
| Polymer dispersant 2 + NaSCN | 0.44 | 0.15 |
| DARACEM ®[†] 100 | 0.31 | 0.0 |

[†]W. R. Grace & Co.-Conn. superplasticizer comprising a condensation product of naphthalene sulfonic acid.

It can be seen that the ratio of the solution viscosity-reducing agent to polymer dispersant in the above admixtures ranges from about 1:6 to about 1:2. In the above table, "%s/s" denotes the weight of cement additive expressed as a percentage of the dry weight of hydraulic cement binder in the cement composition. After addition of the admixture, each concrete batch was mixed for 2 minutes, then poured into a steel form which was treated with DRYDENE form release agent. The concretes were vibrated internally with a spud vibrator which was inserted into the concrete and moved with a consistent dragging action. After vibration the cast concrete was allowed to harden into a structural unit. After removal from the forms, the surface characteristics of each structural unit were visually inspected and compared to a structural unit made from the DARACEM 100 reference mix. Since only s a visual inspection was made, all descriptions herein of bughole size and number represent the best estimate of the inspector.

The surface of the structural unit containing Daracem 100 had a porous texture; i.e., it was slightly rough to the touch, and had irregularly-spaced bugholes averaging about ½" deep ×1" diameter in size homogeneously distributed over the surface. The number of bugholes was too large to count. In contrast, the surface of the structural unit containing only Polymer Dispersant 2 had a matte finish and about 2-5 bugholes/ft$^2$. The bugholes were of the same general size as the Daracem 100 structural unit. The surface of the structural unit containing Polymer Dispersant 2 and NaSCN had a clean, glossy and surprising "mirror-like" finish, and was substantially void-free compared to the structural unit containing only Polymer Dispersant 2.

The surface of the structural unit containing only Polymer Dispersant 1 also had a matte finish, but had slightly fewer voids than the structural unit containing only Polymer Dispersant 2. The surface of the structural units containing Polymer Dispersant 1 and NaSCN were clean, progressively glossier and "mirror-like", and the average number of bugholes decreased as the dosage of NaSCN increased, with the highest dosage of NaSCN in the concrete producing a bughole-free piece.

EXAMPLE 3

The bughole-reducing performance of admixtures of the invention containing solvent viscosity-reduction agents in addition to sodium thiocyanate were tested in the following manner. Concrete batches were prepared as in Example 2, but using 470.8 kg Portland cement, 98.9 kg class F fly ash, 1596.6 kg ⅜" crushed stone, 1052.3 kg sand, 264.9 kg water. Admixtures shown in Table 3 were also prepared and added as in Example 2.

TABLE 3

| | Total dose (% s/s on cement) | Viscosity-reduction agent dose (% s/s on cement) |
|---|---|---|
| WRDA ®-19[†] | 0.31 | 0.0 |
| Polymer Dispersant 1 | 1.103 | 0.25 |
| Polymer Dispersant 1 + NASCN | 0.38 | 0.13 |
| Polymer Dispersant 1 + NaI | 0.48 | 0.23 |
| Polymer Dispersant 1 + urea | 0.35 | 0.10 |

[†]W. R. Grace & Co.-Conn. superplasticizer comprising a condensation product of naphthalene sulfonic acid.

After addition of the admixture each concrete batch was mixed for 2 minutes, then poured into a steel form which was treated with a form release agent. The concretes were vibrated internally with a 2" diameter spud vibrator which was slowly lowered into and raised from the concrete at four points (about 15 seconds each insertion). After vibration the cast concrete was allowed to harden into a structural unit having four trapezoidal faces of about 5'×3'×1.5'. After removal from the forms, the surface characteristics of each structural unit were visually inspected and compared to a structural unit made from a reference mix containing WRDA-19.

The surface of the structural unit made from the reference mix had a rough texture and bugholes of the average dimensions noted in Example 3 spaced irregularly over the surface, i.e., approximately 40/ft$^2$ of each face of the unit. The surface of the structural unit containing only Polymer Dispersant 1 had a glossy finish and substantially fewer bugholes of the same size, i.e., about 20-25 per face. Structural units with Polymer Dispersant 1 and the various viscosity-reduction agents shown in Table 3 were substantially free of surface voids, i.e., about 2-5 per face.

EXAMPLE 4

The bughole-reducing performance of an admixture of the invention containing a polymer dispersant having polyether side chains was tested in the following manner. Concrete was prepared in 2.5 cubic yard batches. Each batch was prepared by mixing together 1213 kg Portland cement, 4414 kg ¾" rounded aggregate, 3359 kg sand, and 216 kg water for 30 seconds, then adding an admixture to each as indicated in Table 4, below.

The polymer dispersant was MALIALIM 0531 (Nippon Oil and Fats Co., Inc.), a copolymer of maleic anhydride and an allyl ether of the formula $CH_2=CHCH_2O(C_2H_4O)_9CH_3$ and having a number average molecular weight of from about 5,000 to 25,000 and was prepared in accordance with the procedure detailed in U.S. Pat. No. 4,946,904. Admixtures shown in Table 4 were also prepared and added as in Example 2.

TABLE 4

| | Total admixture dose (% s/s on cement) | NaSCN component dose (% s/s on cement) |
|---|---|---|
| Polymer dispersant | .15 | 0.0 |

TABLE 4-continued

|  | Total admixture dose (% s/s on cement) | NaSCN component dose (% s/s on cement) |
|---|---|---|
| Polymer dispersant + NaSCN | .14 | 0.05 |

After addition of the admixture, each concrete batch was mixed for 2 minutes, then poured into a steel form which was treated with CRESSET 880 form release agent. The forms were vibrated externally during addition of the concrete. Shortly after addition of the concrete vibration was stopped and the cast concrete was allowed to harden into an open vault-shaped structural unit having about 3–6" thick walls and dimensions of about 4' high×10' long×6' wide. After removal from the forms, the surface characteristics of each structural unit were visually inspected.

The surface of the structural unit containing only the polymer ciispersant was rough to the touch. Irregularly-spaced bugholes of the same average size as previously described were homogeneously distributed over the surface. The number of bugholes was too large to count. The structural unit containing the polymer dispersant and NaSCN, by contrast, was clean, smooth to the touch and had very few bugholes per face of the structural unit, in any event no greater than 10 per face.

What is claimed is:

1. A method of making a substantially bughole-free cement structural unit having a substantially smooth and clean formed surface, comprising the steps of
    a) providing a form;
    b) preparing a cement composition;
    c) adding to said cement composition: a water-soluble polymer dispersant, said water-soluble polymer dispersant defined as any water-soluble polymeric compound that functions as a dispersant or hydraulic cement superplasticizer, and comprises 1) a polymeric backbone moiety and 2) polymeric side chain moieties, wherein one of said 1) and 2) polymeric moieties is a polyether moiety, and the other is a non-polyether moiety formed by polymerization of ethylenically-unsaturated monomers; and a solution viscosity-reducing agent, said solution viscosity-reducing agent being a water-soluble compound, which, when added to a solution of said water-soluble polymer dispersant, reduces its viscosity;
    d) placing said cement composition of step c) into said form,
    e) curing said placed cement composition in said form to form a hardened structural unit, and
    f) removing said hardened structural unit from said form, whereby said substantially bughole-free cement structural unit having a substantially smooth and clean formed surface is obtained.

2. The method of claim 1 wherein said polymer dispersant is a graft copolymer plasticizer, wherein said graft copolymer plasticizer comprises a polyether backbone polymer having an average molecular weight of about 200 to 30,000 and has side-chain polymers prepared by polymerization of an ethylenically-unsaturated monomer, said graft copolymer plasticizer containing about 2% to 40% by weight of said side-chain polymers.

3. The method of claim 1 wherein said polymer dispersant comprises a copolymer of an allyl-terminated polyoxyalkylene and a comonomer selected from the group consisting of maleic acid, maleic anhydride, and acrylic acid.

4. The method of claim 1 wherein said polymer dispersant comprises a copolymer of maleic anhydride and an allyl ether having the formula $CH_2=CHCH_2O(C_2H_4O)_9CH_3$ and having a number average molecular weight of from about 5,000 to 25,000.

5. The method of claim 1 wherein said solution viscosity-reducing agent is selected from the group consisting of alkali metal and alkaline earth metal salting-in salts of the lyotropic series, and low molecular weight amide group-containing compounds; and the weight ratio of said solution viscosity-reducing agent to said polymer dispersant is from about 1:10 to 1:0.5.

6. The method of claim 2 wherein said solution viscosity-reducing agent is selected from the group consisting of alkali metal and alkaline earth metal salting-in salts of the lyotropic series, and low molecular weight amide group-containing compounds; and the weight ratio of said solution viscosity-reducing agent to said polymer dispersant is from about 1:10 to 1:0.5.

7. A method of making a substantially bughole-free cement structural unit having a substantially smooth and clean formed surface, comprising the steps of
    a) applying a release agent to a surface of a form;
    b) preparing a cement composition;
    c) adding to said cement composition: a water-soluble polymer dispersant, said water-soluble polymer dispersant defined as any water-soluble polymeric compound that functions as a dispersant or hydraulic cement superplasticizer, and comprises 1) a polymeric backbone moiety and 2) polymeric side chain moieties, wherein one of said 1) and 2) polymeric moieties is a polyether moiety, and the other is a non-polyether moiety formed by polymerization of ethylenically-unsaturated monomers; and a solution viscosity-reducing agent, said solution viscosity-reducing agent being a water-soluble compound, which, when added to a solution of said water-soluble polymer dispersant, reduces its viscosity;
    d) placing said cement composition of step c) into said form,
    e) curing said placed cement composition in said form to form a hardened structural unit, and
    f) removing said hardened structural unit from said form, whereby said substantially bughole-free cement structural unit having a substantially smooth and clean formed surface is obtained.

* * * * *